United States Patent
Garcia Martinez et al.

(10) Patent No.: US 10,676,404 B2
(45) Date of Patent: Jun. 9, 2020

(54) UREA-AMMONIUM NITRATE FERTILISER

(71) Applicant: SHELL OIL COMPANY, Houston, TX (US)

(72) Inventors: Rafael Alberto Garcia Martinez, Calgary (CA); Cyrille Paul Allais, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/756,300

(22) PCT Filed: Sep. 2, 2016

(86) PCT No.: PCT/EP2016/070770
§ 371 (c)(1),
(2) Date: Feb. 28, 2018

(87) PCT Pub. No.: WO2017/037262
PCT Pub. Date: Mar. 9, 2017

(65) Prior Publication Data
US 2018/0244588 A1   Aug. 30, 2018

(30) Foreign Application Priority Data

Sep. 4, 2015  (EP) .................................... 15183961

(51) Int. Cl.
| | |
|---|---|
| *C05D 9/00* | (2006.01) |
| *C05C 1/00* | (2006.01) |
| *C05C 9/00* | (2006.01) |
| *C05C 1/02* | (2006.01) |
| *C05G 3/00* | (2020.01) |
| *C05D 9/02* | (2006.01) |

(52) U.S. Cl.
CPC .................. *C05C 1/00* (2013.01); *C05C 1/02* (2013.01); *C05C 9/00* (2013.01); *C05D 9/00* (2013.01); *C05D 9/02* (2013.01); *C05G 3/0058* (2013.01); *C05G 3/0076* (2013.01)

(58) Field of Classification Search
None
See application file for complete search history.

(56) References Cited

U.S. PATENT DOCUMENTS

| | | | | | |
|---|---|---|---|---|---|
| 2,070,658 | A | * | 2/1937 | Hartenstein | C05B 1/00 71/23 |
| 4,239,522 | A | * | 12/1980 | Wilson | C05C 1/00 71/29 |
| 4,762,546 | A | * | 8/1988 | Boles | C05C 1/00 423/545 |
| 5,082,487 | A | * | 1/1992 | Mayer | C05C 1/00 71/30 |
| 8,628,598 | B1 | * | 1/2014 | Miller | C05B 7/00 239/727 |
| 9,598,322 | B2 | * | 3/2017 | Allais | C05C 9/005 |
| 2003/0029211 | A1 | * | 2/2003 | Sheppardson | C05B 7/00 71/33 |
| 2014/0060130 | A1 | * | 3/2014 | Purtle | C05B 17/00 71/23 |
| 2017/0029343 | A1 | * | 2/2017 | Ginn | B01D 53/1475 |

* cited by examiner

*Primary Examiner* — Wayne A Langel

(57) ABSTRACT

A fertiliser comprising both sulphur and a solution of urea and ammonium nitrate in water is disclosed. Processes for making such a fertiliser are also disclosed.

9 Claims, No Drawings

UREA-AMMONIUM NITRATE FERTILISER

PRIORITY CLAIM

The present application is the National Stage (§ 371) of International Application No. PCT/EP2016/070770, filed Sep. 2, 2016, which claims priority from European Patent Application No. 15183961.0, filed Sep. 4, 2015, incorporated herein by reference.

FIELD OF THE INVENTION

The present invention provides a sulphur-enriched urea-ammonium nitrate fertiliser and a process for the preparing such a fertiliser.

BACKGROUND OF THE INVENTION

A solution of urea and ammonium nitrate in water (known as UAN) is commonly used as a fertiliser, supplying nitrogen to plants. The solution may be prepared by mixing urea (as a solid or solution) with ammonium nitrate (as a solid or solution) and process water. The pH of the product may be adjusted by addition of nitric acid or ammonia, and a corrosion inhibitor may be added. Many soils also require sulphur as a plant nutrient.

CA 811080 proposes preparing stable suspensions of finely divided sulphur in a concentrated aqueous solution of urea and ammonium nitrate, utilizing a clay such as attapulgite as stabiliser, by applying shear to a pregelled mixture of clay, urea, ammonium nitrate and water, and subsequently adding the finely divided sulphur. The amount of finely divided sulphur, for example with 98% of particles able to pass through a 100 mesh (which is approximately 150 microns), in the suspension is variable and ranges between about 10% to about 50% by weight, preferably between about 15% to about 30% by weight. U.S. Pat. No. 3,519,413 also looks to prepare stable suspensions of fertilisers, which in one combination may be UAN fertilisers. U.S. Pat. No. 3,519,413 discloses that finely divided particles in the context of a fertiliser for application to the soil are particularly particles with 90% of the solids being of a size above 0.1 mm, which is approximately 100 microns.

U.S. Pat. No. 5,082,487 discloses solutions of ammonium sulphate, ammonium nitrate and urea, which can be used to deliver both nitrogen and sulphur to plants. The solutions comprise at least about 12.5 percent by weight of ammonium sulphate (which is equivalent to at least about 3 percent by weight of elemental sulphur). Such a fertiliser solution provides a soluble form of sulphur and this may leach when applied to the soil. An alternative means of applying sulphur is to supply a mixture of UAN with ammonium thiosulphate. The ammonium thiosulphate is a relatively expensive product.

The present inventors have sought to provide an alternative fertiliser that can provide both nitrogen and sulphur to the soil, and that avoids some of the problems of the known fertilisers.

The present inventors have also sought to provide a use for weak aqueous solutions of urea and ammonia (known as scrubber liquor) that are produced as a waste product of the urea manufacturing process. The streams are produced as a byproduct of gas treatment processes that are employed to reduce dust. The scrubber liquor may additionally comprise salts such as ammonium sulphate or nitrate if ammonia emissions are also controlled. Treatment of the scrubber liquor streams is costly and involves the evaporation of water from such streams or the production of UAN solutions. It would be advantageous to devise a process in which scrubber liquors are a useful feedstock.

SUMMARY OF THE INVENTION

Accordingly, the present invention provides a fertiliser wherein elemental sulphur particles are dispersed within a solution of urea and ammonium nitrate in water. The inventors have found that elemental sulphur can be advantageously combined with a solution of urea and ammonium nitrate in water, thereby providing a fertiliser that delivers both nitrogen and sulphur and wherein the sulphur is in a slow release form that is delivered gradually to the soil as the elemental sulphur particles are oxidised to sulphate.

The invention further provides a process for preparing a fertiliser wherein elemental sulphur particles are dispersed within a solution of urea and ammonium nitrate in water, comprising steps of:
(a) wet milling solid or liquid elemental sulphur, wherein the wet milling optionally takes place in the presence of an aqueous solution comprising urea and/or ammonium nitrate, to provide a dispersion; and
(b) optionally adding urea and/or ammonium nitrate to the dispersion.

The invention yet further provides a process for preparing a fertiliser wherein elemental sulphur particles are dispersed within a solution of urea and ammonium nitrate in water, comprising steps of:
(i) preparing a dispersion of elemental sulphur particles in urea, and
(ii) mixing the dispersion of elemental sulphur particles in urea with an aqueous solution of ammonium nitrate and/or nitric acid, and optionally with ammonia.

The inventors have found that scrubber liquors can be advantageously used as feedstocks in the processes of the present invention.

DETAILED DESCRIPTION OF THE INVENTION

The present invention provides a fertiliser wherein elemental sulphur particles are dispersed within a solution of urea and ammonium nitrate in water.

Preferably the fertiliser has a total nitrogen content ranging from 24% to 31 wt %, based upon the total weight of the fertiliser. In a preferred embodiment, the relative amount of urea to ammonium nitrate remains constant and for every four units of ammonium nitrate present, three units of urea are present. Preferably the ammonium nitrate content ranges from 34 wt % to 45 wt %, based upon the weight of the fertiliser. Preferably the urea content ranges from 26 wt % to 34 wt %, based upon the weight of the fertiliser. Preferably the elemental sulphur content ranges from 1 wt % to 15 wt %, more preferably from 3 to 10 wt %, based on the weight of the fertiliser.

The elemental sulphur particles suitably have an average particle size in the range of from 5 to 20 microns.

Preferably the fertiliser further comprises a stabiliser. The function of the stabiliser is to maintain a stable dispersion, ensuring that the dispersed elemental sulphur particles remain suspended throughout the dispersion and preventing them from settling. Suitable stabilisers may be chosen from various families of chemicals such as sugars; starches; modified starches; plant and algae derived saccharides such as polydextrose; corn starch; phosphated distarch phosphate; dextrins; hydroxylated starches; agar; Xanthan gum; guar gum; alginin; animal derived compounds such as collagen or gelatins; surfactants such as cationic, anionic, non-ionic, and amphoteric surfactants, such as lignin derived surfactants; fatty acid derivatives; phosphate esters; sulphonates; polyacrylates; biosurfactants such as sophorolipids; Rhamnolipid; soaps such as metal stearate; clays, such as bentonite clay, especially sodium bentonite clay, or attapulgite clays, preferably of the swelling type; and polymers such as polyethylene glycol.

A preferred stabiliser is a clay chosen from bentonite clay or attapulgite clay.

Preferably, the stabiliser is added in an amount of from 0.1 to 15 wt % based on the total weight of the fertiliser.

Most suitably a fertiliser of the present invention comprises:

26 to 34 wt % urea;
34 to 45 wt % ammonium nitrate;
1 to 15 wt % elemental sulphur, preferably 3 to 10 wt %;
0.1 to 15 wt % stabiliser, preferably from 1 to 5 wt %, most preferably from 1 to 3 wt %; and
sufficient water to provide a solution of the urea and ammonium nitrate components. There must of course not be more than 100 wt % of components in total. All percentages are given based on the weight of the total fertiliser.

Throughout the description and claims of this specification, the words "comprise" and "contain" and variations of the words, for example "comprising" and "comprises", mean "including but not limited to", and do not exclude other moieties, additives, components, integers or steps.

The present invention further provides a process for preparing a fertiliser wherein elemental sulphur particles are dispersed within a solution of urea and ammonium nitrate in water comprising steps of:

(a) wet milling solid or liquid elemental sulphur, wherein the wet milling optionally takes place in the presence of an aqueous solution comprising urea and/or ammonium nitrate, to provide a dispersion; and (b) optionally adding urea and/or ammonium nitrate to the dispersion.

Wet milling suitably takes place in a dispersion mill. Preferably the dispersion mill has a rotor that turns within a slotted stator. The elemental sulphur and water are drawn by the rotation of the rotor into the rotor/stator assembly, and are accelerated and expelled radially through the openings in the slotted stator. With each pass through the rotor/stator assembly, the elemental sulphur is subjected to a combination of mechanical and hydraulic shear such that particles of solid elemental sulphur are reduced in size or, in the case of liquid elemental sulphur, dispersed forming a dispersion which is thought to be composed of small individual droplets within the urea continuous phase.

A preferred dispersion mill has a slotted rotor inside a slotted stator. When the rotor and stator slots come into alignment, the elemental sulphur is ejected from the rotor slots into the stator slots. Suitable dispersion mills are described in U.S. Pat. No. 5,522,553 and are available from Kady International, USA.

The sulphur in step (a) may be solid or liquid elemental sulphur, but is preferably added as solid sulphur because this avoids having to keep the sulphur at a high temperature (sulphur is liquid above 120° C.). The sulphur is preferably added as pellets, e.g. rotoformed pellets of average size from 3 to 4 mm.

The elemental sulphur used can be obtained from any suitable source. The elemental sulphur used may be high purity (>99.9% S) chemical sulphur as obtained from the Claus process. However, the process of the present invention can use elemental sulphur of significantly lower purity than this.

The wet milling optionally takes place in the presence of an aqueous solution comprising urea and/or ammonium nitrate, but can alternatively take place in water. In step (b), urea and/or ammonium nitrate are optionally added to the dispersion. In a first and preferred embodiment of this process, the wet milling takes place in the presence of a solution comprising urea and ammonium nitrate, and it is not necessary to add urea or ammonium nitrate in step (b) (although this may be done if the skilled person wishes to adjust the proportions of components). In a second embodiment of the process, the wet milling takes place in the presence of a solution comprising urea, and ammonium nitrate is added to the dispersion in step (b). In a third embodiment of the process, the wet milling takes place in the presence of a solution comprising ammonium nitrate, and urea is added to the dispersion in step (b). In a fourth embodiment of the process, the wet milling takes place in the presence of water, and urea and ammonium nitrate are added to the dispersion in step (b).

In the first and preferred embodiment of this process, wherein the wet milling takes place in the presence of a solution comprising urea and ammonium nitrate, the solution may be a commercial UAN solution having a nitrogen content ranging from 28% to 32% or may be a solution having different proportions of urea and ammonium nitrate.

The wet milling may advantageously take place in a scrubber liquor produced as part of a urea manufacturing process. This is a valuable use of a stream that may otherwise have to be treated as a waste stream.

The energy input during the milling can be expressed as power per volume or mass of sulphur processed, e.g. kWh/$m^3$ sulphur processed or kWh/ton sulphur processed. The energy input affects the size of the milled sulphur particles in the resulting dispersion, so is chosen according to the required particle size. Higher energy input typically provides smaller particle sizes. For a particular mill, higher energy input can be achieved by reducing the amount of sulphur that is milled. Preferably the energy input is from 10 (preferably above 20) to 1000 kWh/ton sulphur processed, more preferably from 50 to 100 kWh/ton sulphur processed, even more preferably from 65 to 85 kWh/ton sulphur processed. Part of this higher energy will be transferred to the dispersion being formed in step (a) as thermal energy thereby increasing the temperature thereof. Such temperature increase can be controlled using a suitable heat exchanger (possibly incorporated in the dispersion mill). Preferred temperatures for wet milling are between 0 and 120° C., more preferably between 15 and 80° C.

Additional components such as stabilisers may be added in step (a), in step (b), or in both steps (a) and (b).

The present invention also provides a process for preparing a fertiliser wherein elemental sulphur particles are dispersed within a solution of urea and ammonium nitrate in water, comprising steps of:

(i) preparing, preferably but not necessarily, by wet milling, a dispersion of elemental sulphur particles in urea, and (ii) mixing the dispersion of elemental sulphur particles in urea with an aqueous solution of ammonium nitrate and/or nitric acid, and optionally with ammonia.

The dispersion of elemental sulphur particles in urea prepared in step (i) suitably has from 1 unit (weight) of urea per unit (weight) of sulphur to 32 units (weight) of urea per unit (weight) of sulphur.

The elemental sulphur used in step (i) can be obtained from any suitable source. The elemental sulphur used may be high purity (>99.9% S) chemical sulphur as obtained from the Claus process. However, the process of the present invention can use elemental sulphur of significantly lower purity than this.

The urea used in either process of the invention, but particularly in step (i) can be pure urea. It may also be urea obtained directly from a process for preparing urea (e.g. a melt or solution taken directly from the synthesis loop in a urea production facility, or even an off-stream of low purity from a urea production facility). The urea may contain a significant amount of free ammonia.

In a first embodiment of this process, step (i) is achieved by a process wherein a stream of liquid urea is mixed with a stream of liquid elemental sulphur to form an emulsion comprising elemental sulphur particles which are dispersed in the urea. Wet milling is a preferred process to achieve a dispersion but other dispersion techniques may also be used. The mixing can suitably take place in a dispersion mill wherein a rotor turns within a slotted stator, or in a static mixer. Preferably, the mixing device is a dispersion mill substantially as described above. A temperature is applied which maintains the elemental sulphur substantially in the liquid form in the mixing device.

Examples of such processes are described in WO2014009326. A stream of liquid urea is mixed with a stream of liquid elemental sulphur in the presence of an anionic surfactant to form an emulsion comprising elemental sulphur particles which are coated with a layer of the anionic surfactant and dispersed in the urea. The anionic surfactant preferably comprises a material derived from the Lignin family of chemicals such as a lignosulphonate. The anionic surfactant may be added to the urea before the elemental sulphur is mixed with the urea, or the anionic surfactant may be added to the elemental sulphur, or the anionic surfactant may be added as a separate stream.

In a second embodiment of this process, step (i) is achieved by a process substantially as described in WO2015104286. Urea and sulphur are supplied to a dispersion mill wherein a rotor turns within a slotted stator, thereby providing a dispersion of molten urea and molten sulphur. Solid sulphur, solid urea and/or solid urea-sulphur are supplied to the dispersion mill. The solid urea, solid sulphur and/or solid urea-sulphur are drawn by the rotation of the rotor into the rotor/stator assembly, and are accelerated and expelled radially through the openings in the slotted stator. With each pass through the rotor/stator assembly, the solid is subjected to a combination of mechanical and hydraulic shear such the particles of solid urea, solid sulphur or solid urea-sulphur are reduced in size. The solid urea, solid sulphur or solid urea-sulphur is also subjected to heating and will melt. Further energy may be supplied to the dispersion mill, e.g. the mill is jacketed and a fluid is passed through the jacket to heat the mill, or electrical heating is applied to the mill. Preferably the temperature in the dispersion mill is from 115 to 150° C., more preferably from 130 to 145° C. and most preferably from 135 to 140° C. Preferably the preferred energy input for the mill is from 1 to 100 kWh/tonne product. A preferred dispersion mill has a slotted rotor inside a slotted stator. One or more surfactants may supplied to the dispersion mill. The surfactants could include cationic surfactants such as the ethylene oxide or propylene oxide adduct of an aliphatic amine, or could include anionic surfactants such as a lignosulphonate.

In an alternative to the second embodiment of this process, step (i) is achieved by a process wherein urea and sulphur are supplied to a static mixer, thereby providing a dispersion of molten urea and molten sulphur.

In step (ii), the dispersion of elemental sulphur particles in urea is mixed with an aqueous solution of ammonium nitrate and/or nitric acid, and optionally with ammonia. In a first embodiment of step (ii), the dispersion of elemental sulphur particles in urea is mixed with an aqueous solution of ammonium nitrate. This suitably takes place in a tank. In a second embodiment of step (ii), the dispersion of elemental sulphur particles in urea is mixed with an aqueous solution of urea and ammonium nitrate (a UAN solution). This suitably takes place in a tank. In a third embodiment of step (ii), the dispersion of elemental sulphur particles in urea is mixed with an aqueous solution of nitric acid and optionally with ammonia. The ammonia is not required if the urea contains significant amounts of free ammonia. The nitric acid will react with ammonia to provide ammonium nitrate. This preferably takes place in a static mixer.

In a preferred embodiment of the invention, in step (ii) a scrubber liquor may be mixed with the dispersion of elemental sulphur particles in urea.

Additional components such as stabilisers may be added in step (i), in step (ii), or in both steps (i) and (ii).

That which is claimed is:

1. A process for preparing a fertiliser, the process comprising the steps of:
   (a) wet milling solid or liquid elemental sulphur, wherein the wet milling takes place in the presence of an aqueous solution comprising urea and ammonium nitrate, to provide a dispersion of elemental sulphur particles; and
   (b) adding urea and ammonium nitrate to the dispersion, wherein the urea comprises free ammonia;
   wherein the urea, the ammonium nitrate, and water are added together or independently in either or both of steps (a) and (b), such that at the end of step (b) the fertiliser has been prepared; and
   wherein the urea and free ammonia comprise an aqueous solution that is produced as a waste product during an urea manufacturing process and is used as feedstock during the process.

2. A process according to claim 1, wherein the wet milling takes place in a dispersion mill having a rotor that turns within a slotted stator.

3. A process for preparing a fertiliser, the process comprising the steps of:
   (i) preparing a dispersion of elemental sulphur particles in urea, wherein the urea comprises free ammonia, and wherein the urea and free ammonia comprise an aqueous solution that is produced as a waste product during an urea manufacturing process and is used as feedstock during the process, and
   (ii) mixing the dispersion of elemental sulphur particles in urea with an aqueous solution of ammonium nitrate and nitric acid.

4. A process according to claim 3, wherein in step (i) the dispersion of elemental sulphur particles in urea is prepared by a process wherein a stream of liquid urea is mixed with a stream of liquid elemental sulphur to form an emulsion comprising elemental sulphur particles which are dispersed in the urea.

5. A process according to claim 4, wherein the stream of liquid urea is mixed with the stream of liquid elemental sulphur in the presence of an anionic surfactant to form an emulsion comprising elemental sulphur particles which are coated with a layer of the anionic surfactant and dispersed in the urea.

6. A process according to claim 3, wherein in step (i) urea and sulphur are supplied to a dispersion mill wherein a rotor turns within a slotted stator or urea and sulphur are supplied to a static mixer, thereby providing a dispersion of molten urea and molten sulphur.

7. A process according to claim 3, wherein in step (ii), the dispersion of elemental sulphur particles in urea is mixed with an aqueous solution of ammonium nitrate.

8. A process according to claim 3, wherein in step (ii), the dispersion of elemental sulphur particles in urea is mixed with an aqueous solution of urea and ammonium nitrate.

9. A process according to claim 3, wherein in step (ii), the dispersion of elemental sulphur particles in urea is mixed with an aqueous solution of nitric acid.

* * * * *